United States Patent
Mathur et al.

(10) Patent No.: US 12,267,360 B2
(45) Date of Patent: Apr. 1, 2025

(54) URL PATTERN-BASED RISK SCORING AND ANOMALY DETECTION

(71) Applicant: Omnissa, LLC, Mountain View, CA (US)

(72) Inventors: Pratul Mathur, Bengaluru (IN); Siavash James Joorabchian Hawkins, Canterbury (GB); Rohan Sartho, Bengaluru (IN)

(73) Assignee: Omnissa, LLC, Mountain View, CA (US)

( * ) Notice: Subject to any disclaimer, the term of this patent is extended or adjusted under 35 U.S.C. 154(b) by 266 days.

(21) Appl. No.: 17/830,853

(22) Filed: Jun. 2, 2022

(65) Prior Publication Data

US 2023/0396649 A1     Dec. 7, 2023

(51) Int. Cl.
*H04L 9/40* (2022.01)
*G06F 16/955* (2019.01)
*G06F 21/55* (2013.01)

(52) U.S. Cl.
CPC ........ *H04L 63/1483* (2013.01); *G06F 16/955* (2019.01); *H04L 63/20* (2013.01); *G06F 21/552* (2013.01)

(58) Field of Classification Search
CPC ........... H04L 63/14–1491; H04L 63/20; G06F 21/50–577
See application file for complete search history.

(56) References Cited

U.S. PATENT DOCUMENTS

| | | | |
|---|---|---|---|
| 8,108,923 B1* | 1/2012 | Satish | H04L 63/1425 713/168 |
| 8,443,452 B2* | 5/2013 | Koulinitch | H04L 63/1483 726/26 |
| 8,478,708 B1* | 7/2013 | Larcom | G06Q 10/06 713/182 |
| 2019/0259021 A1* | 8/2019 | Lu | G06Q 20/326 |
| 2020/0076986 A1* | 3/2020 | Sakiyama | H04N 1/00018 |

FOREIGN PATENT DOCUMENTS

EP    2953298 B1 *   3/2018  ............. H04L 43/04

* cited by examiner

*Primary Examiner* — Madhuri R Herzog
(74) *Attorney, Agent, or Firm* — Kim & Stewart LLP (57) ABSTRACT

Systems and methods are described for Uniform Resource Locator ("URL") pattern-based high-risk browsing and anomaly detection. In an example, a user device can compare URLs in a browser's history to URL patterns in a provided list to identify matches. The user device can calculate a browsing risk score based on the percentage of entries in the browsing history that match each URL pattern and a risk score associated with the URL pattern. Security policies can be enforced at the user device if the browsing risk score exceeds a threshold. The user device can also detect potentially dangerous anomalous browsing behavior. The user device can calculate a deviance score based on variations between recent browsing history and historical browsing behavior at the user device. Security policies can be enforced at the user device if the deviance score exceeds a threshold.

17 Claims, 6 Drawing Sheets

URL PATTERN-BASED RISK SCORING AND ANOMALY DETECTION

BACKGROUND

Businesses today are moving away from applications that are installed on user devices and toward web-based applications. For example, software as a service ("SaaS") is a popular software licensing and delivery model used, particularly with enterprises. Web-based application delivery can ensure that customers are always using the most up-to-date version of the application and allows access to the application from almost any device that has an Internet connection.

Since enterprises began focusing more on web-based application delivery, hackers and other malicious actors have directed their efforts to gaining unauthorized access to user devices through web browsers. For example, if a user visits an unsafe website, the website can cause malware to be installed on the user device, which can compromise the user device's security posture.

To address this, some solutions implement a scoring system that generates an overall device risk score by considering various attributes on the device, such as the state of operating system, installed applications, and so on. These solutions, however, do not take the user's browsing history into account. However, the browsing history can be a critical source for identifying potential security risks to an enterprise.

As a result, a need exists for risk scoring and anomaly detection of a user's browsing activity.

SUMMARY

Examples described herein include systems and methods for URL pattern-based risk scoring and anomaly detection. In an example, a management server can provide a reference set of URL patterns to a user device. The URL reference set can include URL patterns associated with known web sites and a URL risk score corresponding to each URL pattern. A web browser on the user device can use the URL reference set to calculate a browsing risk score that indicates a risk level of a user's web browsing. The browsing risk score can be calculated at the user device so that the user's browsing history does not leave the user device, thereby protecting the user's privacy.

In one example of calculating the browsing risk score, the user device can first identify URL patterns from the reference set that match to URLs in the web browser's history. For each URL pattern, the user device can determine what percentage of entries in the browsing history have a matching URL. The user device can then multiply each percentage by the corresponding URL risk score. The resulting values for each URL pattern can be combined to determine the browsing risk score.

The browsing risk score can be compared to a predetermined threshold that designates when a user's browsing activity is a potential security risk. For example, if the browsing risk score exceeds the threshold, then one or more security policies can be enforced at the user device, such as by locking the device, notifying an administrator ("admin"), wiping data, and blocking access to certain applications or websites.

The user device can also detect when a user's browsing activity deviates from historical browsing behavior. Significant deviations in browsing behavior can indicate a security risk. For example, such deviations can be caused by malware, a compromised device, a change in a user's job functions, the user being under duress, backend redirection, a malicious proxy, and in some cases because of malicious intent of the user.

The user device can detect anomalous browsing activity by calculating a deviance score that measures the deviation of the user's recent browsing activity from historical browsing behavior. In one example of calculating the deviance score, the user device can compare the browsing history in the web browser to a URL reference set that includes URL patterns of websites the user historically has visited and an expectation score that indicates the expected percentage of web site visits for the corresponding URL pattern. For each URL pattern in the reference set, the user device can determine what percentage of entries in the browsing history have a matching URL. The percentage for each URL pattern can be compared to the expectation scores to identify anomalous browsing activity. In one example, the user device can treat the match percentage and expectation score for each URL pattern as a vector pairing and calculate the Euclidean distance of the vector pairings. The result would indicate the average measured distance between vector pairings. In other words, the deviance score can measure the average change in the number of times the user visits each website in the browsing history.

The deviance score can be compared to a predetermined threshold that designates when a user's recent browsing activity is a potential security risk. For example, if the deviance score exceeds the threshold, then one or more security policies can be enforced at the user device, such as by locking the device, notifying an admin, wiping data, and blocking access to certain applications or websites.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for URL pattern-based high-risk browsing and anomaly detection. In an example, a user device can compare URLs in a browser's history to URL patterns in a provided list to identify matches. The user device can calculate a browsing risk score based on the percentage of entries in the browsing history that match each URL pattern and a risk score associated with the URL pattern. Security policies can be enforced at the user device if the browsing risk score exceeds a threshold. The user device can detect potentially dangerous anomalous browsing behavior by calculating a deviance score. The deviance score can be calculated based on variations between recent browsing history and historical browsing behavior at the user device. Security policies can be enforced at the user device if the deviance score exceeds a threshold.

Figure 1:
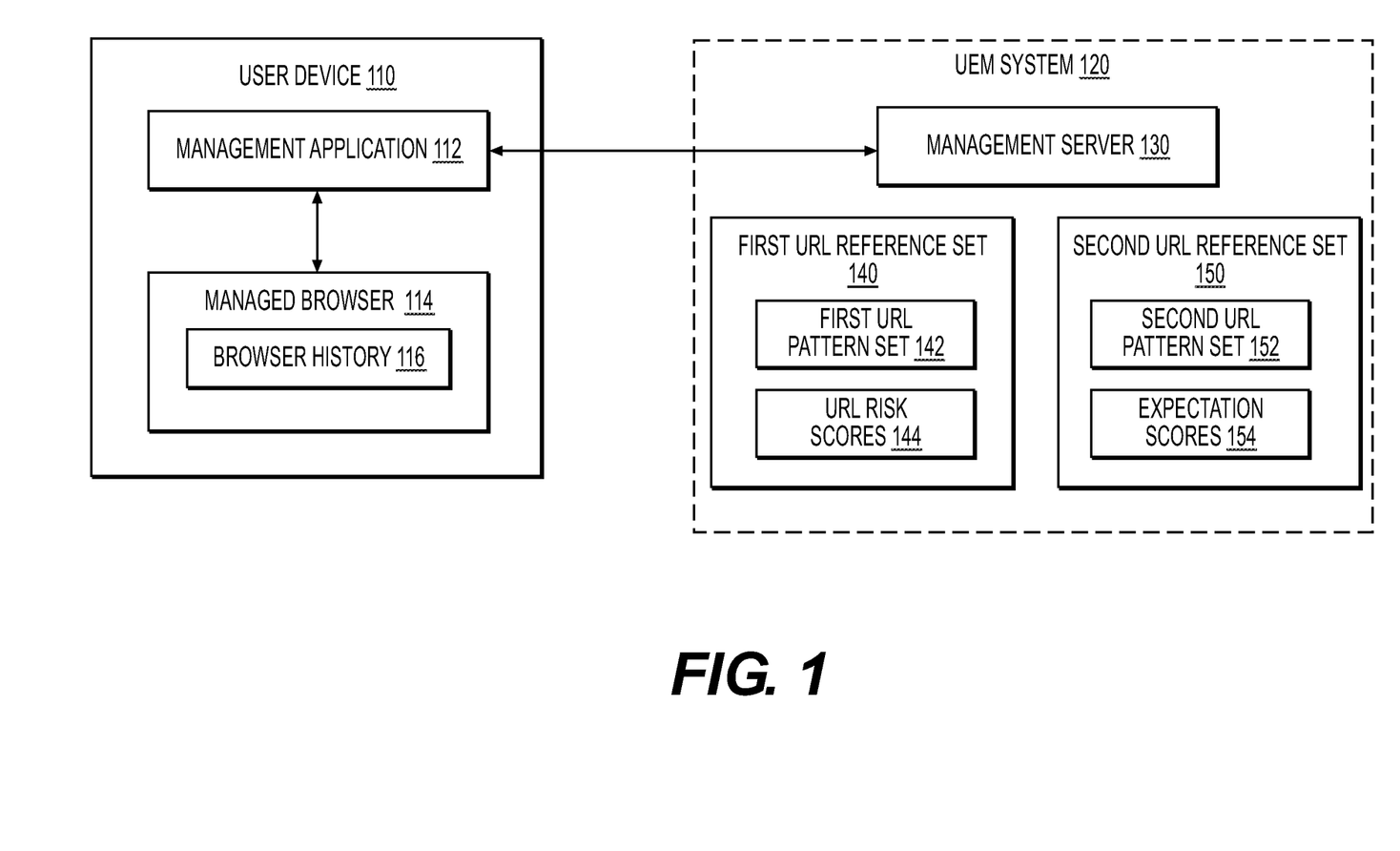
FIG. 1 is an illustration of an example system for URL pattern-based risk scoring and anomaly detection.

FIG. 1 is an illustration of an example system for URL pattern-based risk scoring and anomaly detection. A user device 110 can be enrolled in a Unified Endpoint Management ("UEM") system 120. The user device 110 can be one or more processor-based devices, such as a personal computer, tablet, or cell phone. The UEM system 120 can be any system for managing a group of user devices. A management server 130 can be responsible for managing user devices enrolled in the UEM system 120. The management server 130 can be a single server or a group of servers, including multiple servers implemented virtually across multiple computing platforms. The management server 130 can manage enrolled user devices 110 by sending management instructions to a management application 112 installed on the user devices 110. The management application 112 can be a stand-alone application, part of an enterprise application, or part of an operating system ("OS") of the enrolled user devices 110.

The management application 112 can be downloaded and installed at the user device 110 prior to, or as part of, the enrollment process. For example, a user can download the management application 112 using a URL that points to a content delivery server with an installation file for the management application 112. The URL can be provided by the enterprise, for example. Alternatively, the user can download the management application 112 from an app store, such as APPLE's APP STORE or GOOGLE PLAY. When the user launches the management application 112 for the first time, the management application 112 can prompt the user to enter authentication credentials, such as a username and password or a one-time password ("OTP") provided to the user by the enterprise. The management application 112 can send the user-provided credentials to the management server 130 in an encrypted format.

If the management server 130 can authenticate the credentials, then the management server 130 can begin provisioning the user device 110 for enterprise management. For example, the management server 130 can send a management profile to the management application 112. The management profile can include compliance and security settings assigned to the user's profile and any user groups that the user is assigned to. The management server 130 can also send a security certificate associated with the user's profile that can be used at the user device 110 to access enterprise data and resources, including managed applications. A managed application can be an application that allows control of access and functionality by the UEM system 120. The management server 130 can provision managed applications assigned to the user or the management profile. For example, the management server 130 can provide the management application 112 with installation files or URLs for retrieving the installation files for managed applications.

The management application 112 can configure the user device 110 using the management profile. For example, the management application 112 can install compliance and security settings from the management profile. As an example, the management application 112 can encrypt all or a portion of the user device's hard drive, apply virtual private network ("VPN") settings for accessing UEM data and resources, and set device access controls (e.g., password or personal identification number ("PIN") requirements). The management application 112 can also install and configure managed applications for the user device 110.

After enrollment is complete, the UEM system 120 can actively manage the user device 110 by sending, via the management server 130 or another UEM system, management commands, including any updated compliance and security settings, to the management application 112. The management application 112 can ensure that the user device 110 is up to date with the compliance and security settings prior to allowing access to enterprise data and resources. For example, the management application 112 can analyze the device state of the user device 110 using rules included in the management profile.

The device state can include various aspects of the user device 110, such as the device 110 manufacturer, model, and ID, a current battery charge level, whether the device 110 is jailbroken, OS type and version, geographic location, a login status of the user, and an identification of the applications installed on the device 110. The user device 110 can provide periodic updates of its state information to the management server 130. These updates can provide a full list of the various device aspects in one example, but in another example each update can identify changes from the previous device status update.

The management server 130 can send management commands to the management application 112 using any available communication protocol or channel. For example, the management server 130 can send management commands using an application programming interface ("API"), a notification system, a messaging system native to the user device 110, or a command queue. In one example using a command queue, the management server 130 can store one or more commands in a queue that is available to the user device 110 over a network. The commands can encompass any management action, such as instructing the device 110 to download an application, report a device state, or apply a new profile. The management system can alert the user device 110 to a change in the command queue, such as by sending a notification to the device 110 instructing the device to access the command queue. The notification can be sent through the management application 112 in some examples, but can also be sent as an OS-level notification or a message that utilizes an OS messaging scheme, such as a Short Message Service ("SMS") message.

The management application 112, or in some cases the management server 130, can compare the device state information to one or more compliance rules. For example, a compliance rule can require that a user device 110 not be jailbroken or not run an older version of an OS beyond a particular version number. If the management application 112 detects that the user device 110 is not compliant, then the management application 112 can enforce compliance, such as by locking a device, notifying an admin, blocking access to managed applications, or wiping enterprise data. Additional example compliance standards can include ensuring a device uses particular encryption standards in enterprise data transmission, that the device does not have certain blacklisted applications installed or running, and that the device is located within a geofenced area when accessing certain enterprise resources.

There are various ways that the management application 112 can block access to a managed application. Some examples can include denying the managed application access to secure sign on ("SSO") or shared credentials needed to run the managed application, causing a VPN specific to the managed application to restrict network access, blacklisting a URL for a web-based application, and de-provisioning the managed application, thereby causing the managed application to be uninstalled$_{[TB1]}$.

Some OSs allow for UEM control of a user device without the management application 112. For user devices 110 with such an OS, the management server 130 can send management commands directly to the OS. For example, the management server 130 can send the management profile, management instructions, and managed applications directly to the OS instead of to the management application 112. The management profile for such a user device 110 can include instructions for periodically sending device state information to the management server 130. The management server 130 can analyze the device state information to determine whether the user device 110 is compliant with the UEM compliance and security policies. If the user device 110 is not compliant, the management server 130 can send commands to the OS for enforcing the corresponding policy.

The user device 110 can include a managed browser 114. The managed browser 114 can be a web browser that allows the UEM system 120 to control its access and functionality. The managed browser 114 can execute locally on the user device 110 as a standalone browser or can be built into the management application 112. The managed browser 114 can also be a third-party web browser that the UEM system 120 can manage through a UEM browser extension installed on the web browser.

Configuring a managed browser 114 can include provisioning the managed browser 114 to the user device 110, either by sending an installation file directly, instructing the user device 110 to pull the latest command queue which includes a command to retrieve and/or install the managed browser 114, or by downloading the managed browser 114 by the user device 110, such as in response to an instruction from the management application 112. In some examples, the management application 112 can provide a built-in managed browser 114 that a user can access by navigating within the management application 112 interface. The managed browser 114, or UEM browser extension, can enforce compliance and security settings at the browser 114 according to instructions received from the management server 130 or contained in a management profile stored at the user device 110. The managed browser 114 can include a browser history 116 that includes a list of entries corresponding to websites that have been accessed through the managed browser 114. Each entry can include information about the website visit, such as the website's name, URL, and metadata, such as a timestamp of when the user visited the website and the amount of time spent on the website.

The UEM system 120 can assess user web-browsing behaviors to determine whether activity at the managed browser 114 poses potential security risk. The UEM system 120 can do this without transferring any of the user's browsing history away from the user device 110, thereby protecting the user's privacy. For example, the UEM system 120 can maintain a first URL reference set 140 and a second URL reference set 150. The first URL reference set 140 can include a first URL pattern set 142 and URL risk scores 144. The first URL pattern set 142 can include a list of URL patterns from known websites, and each of the URL patterns can have an associated URL risk score 144. The URL risk scores 144 can be based on any scoring range, such as 0 to 1 or 0 to 10. The UEM system 120 can assign URL risk scores 144 or obtain them from a third-party scoring service. The management server 130 can send the first URL reference set 140 to the user device 110 as a data file, such as a JavaScript Object Notation ("JSON") file.

At the user device 110, entries in the browsing history 116 can be compared to the first URL patterns 142 to identify matching URLs. This comparison can be done by the management application 112 or the managed browser 114 so that the user's browsing history 116 is kept private by not leaving the device 110. Using methods described herein, the management application 112 (or the managed browser 114) can calculate a browser risk score based on the comparison. The browser risk score can be used to enforce compliance and security policies at the user device 110. For example, when a user's browser risk score exceeds a threshold, the management server 130 can send instructions to the management application 112 for restricting access to certain managed applications on the user device 110, locking the user device 110 until an admin user can assess the posture of the user device 110, or denying the user device 110 access to UEM resources and networks. In some examples, the instructions are sent from the management server 130 to the user device 110 beforehand, so that the instructions are available on the user device 110 at the time of the comparison. The management application 112 can also be configured to enforce compliance and security policies in response to a high browsing risk score without waiting for instructions from the management server 130. An admin can also be notified when a user's browsing risk score exceeds a threshold.

The second URL reference set 150 can include second URL pattern set 152, which can include URL patterns corresponding to websites or web domains that the user has visited. Each URL pattern in the second URL pattern set 152 can have an associated expectation score 154. The expectation score 154 can represent the expected percentage of the number of times the associated URL pattern will be accessed out of all the URLs accessed. In other words, the second URL reference set 150 can indicate what percentage of the user's browsing activity is expected to be spent on which websites. The second URL reference set 150 can therefore be a metric that represents expected 'normal' browsing behavior of the user.

At the user device 110, entries in the browsing history 116 can be compared to the second URL patterns 152 to identify matching URLs. For example, this comparison can be done by the management application 112 or the managed browser 114 so that the user's browsing history 116 is kept private. Using methods described herein, the management application 112 (or the managed browser 114) can calculate a deviance score based on the comparison. The deviance score can indicate where a user's recent browsing activity deviates from his or her "normal" browsing behavior. Anomalies in a user's browsing behavior, which can be indicated by a high deviance score, can indicate potential security risks. For example, anomalies can be caused by malware, a compromised device, a change in a user's job functions, a user being under duress, backend redirection, a malicious proxy, and in some cases because of malicious intent of the user.

The deviance score can be used to enforce compliance and security policies at the user device 110. For example, when a user's deviance score exceeds a threshold, the management server 130 can send instructions to the management application 112 for restricting access to certain managed applications on the user device 110, locking the user device 110 until an admin user can assess the posture of the user device 110, or denying the user device 110 access to UEM resources and networks. The management application 112 can also be configured to enforce compliance and security policies in response to a high deviance score without waiting for instructions from the management server 130. An admin can also be notified when a user's deviance score exceeds a threshold.

Figure 2:
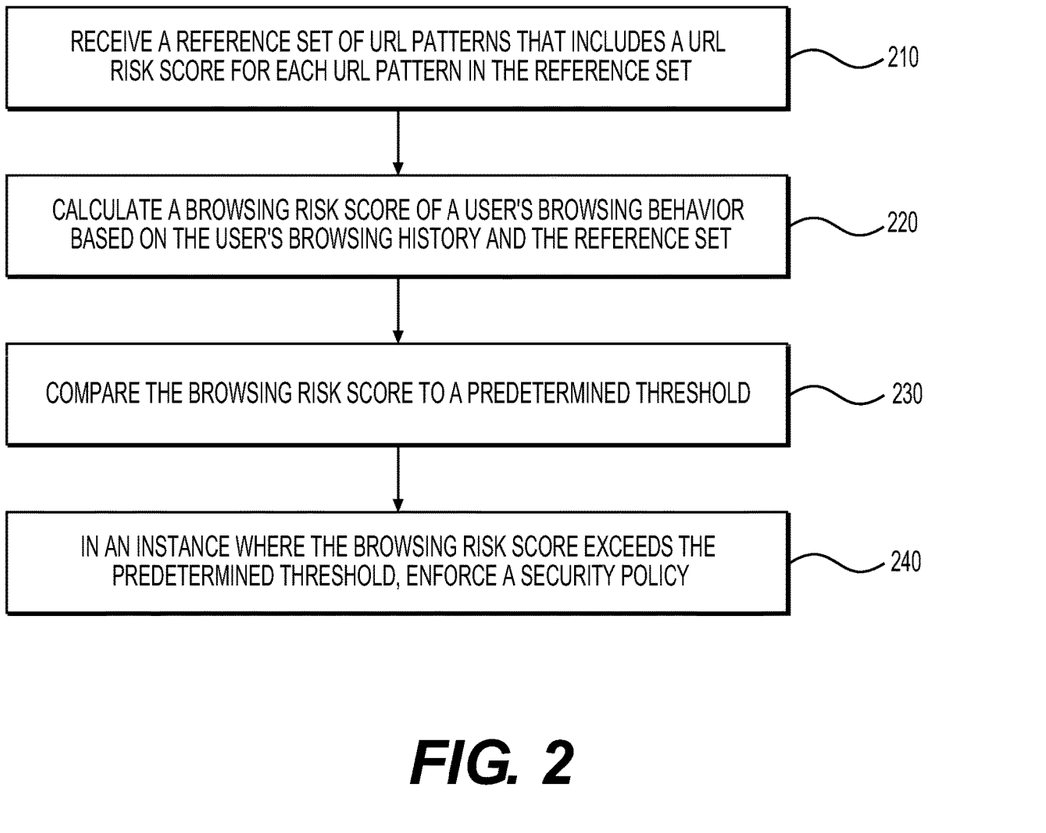
FIG. 2 is a flowchart of an example method for URL pattern-based risk scoring.

FIG. 2 is a flowchart of an example method for URL pattern-based risk scoring. At stage 210, the user device 110 can receive the first URL reference set 140. The first URL reference set 140 can include first URL pattern set 142, each with an associated URL risk score 144 that indicates the risk associated with the URL pattern. The URL risk scores 144 can be based on any scoring range, such as 0 to 1 or 0 to 10. Table 1 shows an example JSON file of a first URL reference set 140:

TABLE 1

```
[
    {
        "url_pattern":"amaznon.co.ip.xkkjw.cn",
        "risk_score":1.0
    },
    {
        "url_pattern":"tiktok.com",
        "risk_score":0.1
    },
    {
        "url_pattern":"*",
        "risk_score":0.0
    }
]
```

In the above example, "url_pattern" corresponds to URL patterns in the first URL pattern set 142, and "risk_score" corresponds to the URL risk scores 144. The range for the risk scores is between 0.0 and 1.0. The first url_pattern "amazon.co.ip.xkkjw.cn" is a known phishing website, so it has a URL risk score 144 of 1.0. The second url pattern "tiktok.com" is the URL for the social media site TIKTOK and is known to be mostly safe, so it has a URL risk score 144 of 0.1. The third url_pattern "*" can be used for URLs in the browser history 116 that do not match to any of the first URL patterns 142. For such URLs, the user device 110 can apply a predetermined default URL risk score 144 that is set by an admin. In this example, a default URL risk score 144 of 0.0 has been assigned to unmatching URLs, but this can be modified. For example, an admin can choose any value within the URL risk score range as the default URL risk score.

At stage 220, the user device 110 can calculate a browsing risk score of the user's browsing behavior based on the user's browsing history 116 and the first URL reference set 140. This can include matching URLs in the browsing history 116 to URL patterns in the first URL pattern set 142.

Matches can be exact or partial. For example, a match can occur if a URL pattern matches to any portion of a URL. In some instances, a URL can match to multiple URL patterns. When this occurs, the matching URL pattern can be determined based on predetermined criteria, such as the matching URL pattern with the closest match or with the highest URL risk score 144. As an example, the URL pattern "website.com" can have a risk score of "0.1," but the URL pattern "website.com/page1" can have a higher risk score of "0.5." Any URLs in the browsing history 116 that match to "website.com/page1" will also match to "website.com." Because "website.com/page1" has a higher risk score, any URLs that match to both URL patterns can be treated as matching only to "website.com/page1."

The risk score can be calculated based on using the identified matches and the URL risk scores 144 of the matched URL patterns. For example, Table 2 includes one example of a formula that can be used to calculate the risk score:

TABLE 2

$$\text{Browsing Risk Score} = \frac{\sum (\text{Match}_n \times \text{Risk Score}_n)}{100}$$

In the example formula above, "$\text{Match}_n$" represents the percentage of URLs in the browsing history 116 that match to the URL pattern "n" in the first URL pattern set 142. For example, if the browser history 116 has 1,000 entries and 100 of them match to "website.com/page1," then the $\text{Match}_n$ for "website.com/page1" would be 10 because 10 percent of the entries match to "website.com/page1." In other words, 10 percent of the pages the user visited with the managed browser 114 included "website.com/page1" in the URL. "$\text{Risk Score}_n$" represents the URL risk score 144 associated with the URL pattern "n."

As an example, assume that the URLs in the browser history 116 match to three URL patterns. The match percentage for the first URL pattern ("$\text{Match}_1$") is 45, the match percentage of URL pattern 2 ("$\text{Match}_2$") is 30, and match percentage of the third URL pattern ("$\text{Match}_3$") is 25. The URL risk scores 144 for the three URL patterns are 0.8, 0.2, and 0.5 respectively. This means that the $\text{Risk Score}_1$ is 0.8, the $\text{Risk Score}_2$ is 0.2, and the $\text{Risk Score}_3$ is 0.5. Using the formula in Table 2, the browsing risk score for the user would be calculated as shown in Table 3 below.

TABLE 3

$$\text{Browsing Risk Score} = \frac{(\text{Match}_1 \times \text{Risk Score}_1) + (\text{Match}_2 \times \text{Risk Score}_2) + (\text{Match}_3 \times \text{Risk Score}_3)}{100} =$$

$$\frac{(45 \times .8) + (30 \times .2) + (25 \times .5)}{100} = 0.545$$

The browsing risk score can be calculated at periodic intervals. Alternatively, or in addition, the browsing risk score can be calculated when an event occurs that may change the browsing risk score, such as when a new URL pattern is added to the first URL reference set 140 or a URL risk score 144 is changed. When such an event occurs, the management server 130 can push an updated file to the user device 110, and the user device 110 can use the updated file to calculate the new browsing risk score.

At stage 230, the user device 110 can compare the browsing risk score to a predetermined threshold. The threshold can be used to designate high-risk browsing behavior. The threshold can be set at the UEM system 120. For example, an admin user can set the predetermined threshold using an admin console. An admin console can be any user device, such as a computer, tablet, or phone, that displays an interface that allows an admin to manage accounts and configuration settings for the UEM system 120. For example, using the admin console, an admin can add URL patterns and scores to the first URL reference set 140, set threshold scores for browsing risk scores, and enforce security policies based on browsing risk scores.

The browsing risk score can also be used to generate a device or user risk score. For example, when assessing whether the user device 110 complies with security policies, the management application 112 can generate scores based on various aspects of the user device 110, such as applications installed, security settings of networks that the user device 110 connects to, and so on. The browsing risk score can be combined with other risk-related scores related to the user device 110 to generate an overall user device risk score.

At stage 240, the user device 110 can enforce a security policy based on the browsing risk score exceeding a threshold. The security policy can be enforced by the management application 112. The management application 112 can be preconfigured with instructions for enforcing security policies when the browsing risk score exceeds the predetermined threshold. Alternatively, the management application 112, or the managed browser 114, can identify the browsing risk score to the management server 130, and the management server 130 can send instructions for enforcing the security policy to the management application 112.

Examples of enforcing the security policy can include locking the user device 110, blocking access to or wiping enterprise data on the user device 110, restricting access to certain applications, notifying an administrator, and so on. Security policies can also be enforced at the managed browser 114. For example, the managed browser 114 can restrict a user's access at the managed browser 114 either partially or completely. As an example, the managed browser 114 can block access to any websites that match to a URL pattern with a URL risk score 144 over a predetermined number. The managed browser 114 can also restrict the user to only accessing pre-approved websites, such as enterprise-related websites. The managed browser 114 can also restrict access to enterprise websites that may contain sensitive data. As an example, if a user has a high browsing risk score, then the managed browser 114 can block access to financial web applications of the enterprise.

The browsing risk score can be reviewed by an administrator. For example, the management application 112 or the managed browser 114 can send the browsing risk score to the management server 130, and the management server 130 can notify an admin. The notification can include the browsing risk score and any other information designated by the UEM system 120. For example, the admin can receive information about the matching URL patterns, their associated risk scores, and their percentage match of total website visits. This can give the admin a broad view of the user's browsing behavior without moving the actual browsing history 116 outside the user device 110. In one example, the admin can receive information only about higher risk websites, such as websites that match to a URL pattern with a URL risk score 144 above a predetermined threshold. The admin can review the information and determine what, if any, security measures should be implemented. The admin can enforce security policies from an admin console. For example, the admin can choose a security policy to enforce at the admin console, and the management server 130 can send instructions to the management application 112 for enforcing the security policy.

The security policy enforcement can include multiple tiers of enforcement. Each tier can have an associated threshold browsing risk score and set of policies to enforce. Each tier can be based on a different risk level. As an example, on a ten-point scale, 1-3 can be "low risk," 4-6 can be "medium risk," and 7-10 can be "high risk." Different security policies can be enforced for each category. For example, if a user's browsing risk score is in the low-risk range, then no security policy is enforced. If the user's browsing risk score is in the medium risk range, then a first-tier security policy can be enforced, such as notifying the user and/or an admin and restricting access to certain websites and applications. If the user's browsing risk score reaches the high-risk range, then a second-tier security policy can be enforced, such as by locking the user device 110 or wiping enterprise data from the user device 110.

Figure 3:
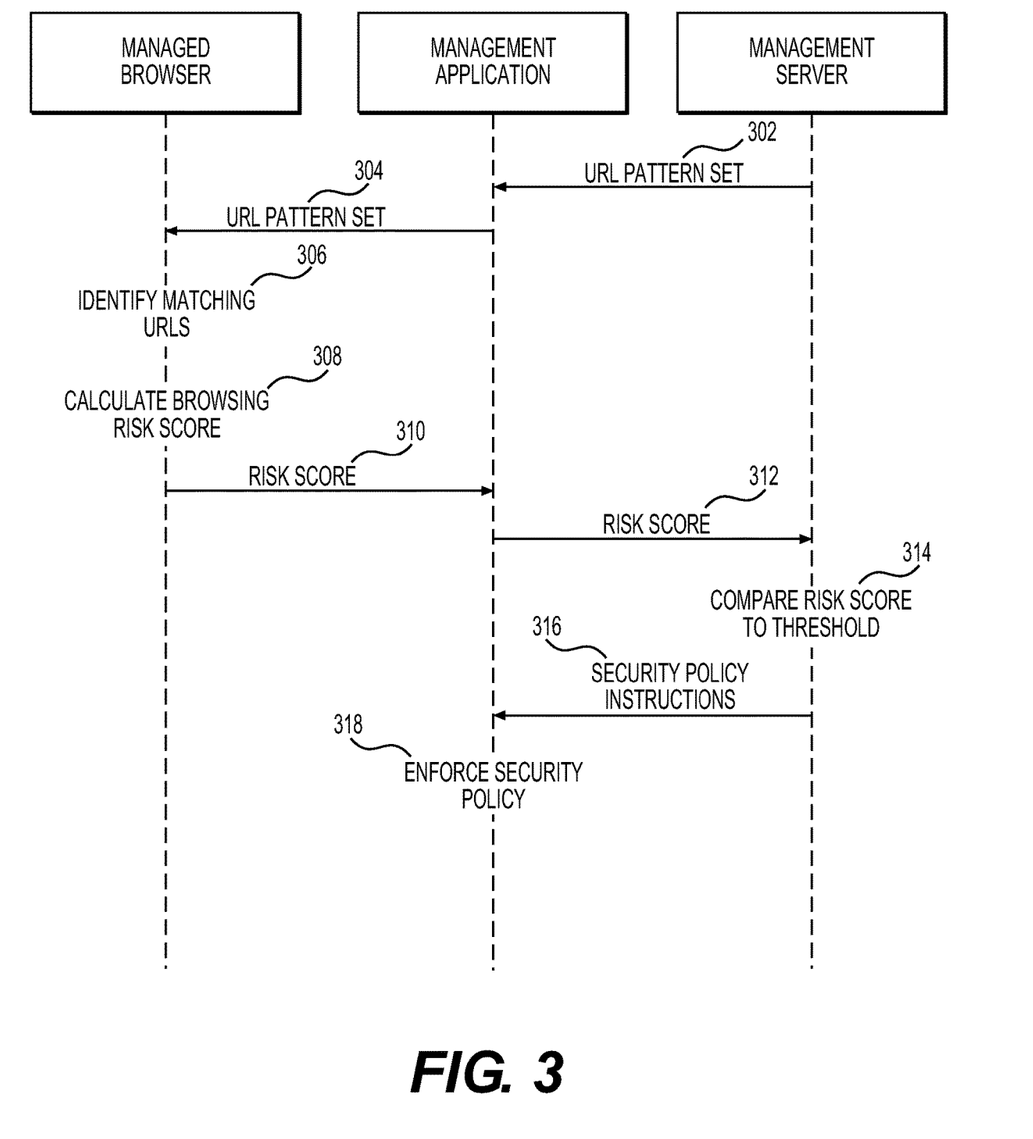
FIG. 3 is a sequence diagram of an example method for URL pattern-based risk scoring.

FIG. 3 is a sequence diagram of an example method for URL pattern-based risk scoring. At stage 302, the management server 130 can send the first URL reference set 140 to the management application 112. The first URL reference set 140 can include the first URL pattern set 142 and URL risk scores 144. The first URL pattern set 142 can include a list of URL patterns from known websites, and each of the URL patterns can have an associated URL risk score 144. The management server 130 can send the first URL reference set 140 as a data file, such as a JSON file. If a version of the first URL pattern set 142 already exists on the user device 110, then the management server 130 can send an update to the first URL pattern set 142, such as new URL patterns or updated URL scores 144.

At stage 304, the management application 112 can send the first URL reference set 140 to the managed browser 114. Sending the first URL reference set 140 can include saving the first URL reference set 140 on the user device 110, such as by saving the first URL reference set 140 as a data file on a hard drive or memory. The managed browser 114 can have access to the data file for calculating the browsing risk.

At stage 306, the managed browser 114 can identify entries in the browsing history 116 that match the first URL reference set 140. For example, each entry in the browsing history 116 can correspond to an instance where the user visited a web page. Each entry can include the URL of the web page and other information, such as the website's name and metadata, such as a timestamp of when the user visited the website and the amount of time spent on the website. For each entry in the browsing history 116, the managed browser 114 can attempt to identify a URL pattern in the first URL pattern set 142 that wholly or partially matches the URL of a browsing history entry. For example, the URL "webpage.com/page1" can match to the URL pattern "webpage.com/page1" and the URL pattern "webpage.com" because both URL patterns exist in the URL. If a URL matches to multiple URL patterns, such as in the example above, then the managed browser 114 can select one URL pattern as the match according to one or more rules. For example, the managed browser 114 can match such a URL to the URL pattern with the highest URL risk score 144 or the longest string of matching characters.

At stage 308, the managed browser 114 can calculate a browsing risk score. The managed browser 114 can calculate the browsing risk score using any kind of formula designated by the UEM system 120. In one example, the browsing risk score can be calculated based on the weighted percentage of entries that a URL pattern matches. For example, the browsing risk score can be calculated using the formula described above in Table 1 regarding FIG. 2.

At stage 310, the managed browser 114 can send the browsing risk score to the management application 112. Sending the browsing risk score can include making the browsing risk accessible by the management application 112. For example, the managed browser 114 can retain the browsing risk score and update the score when certain events occur, such as when the user visits a website or an updated first URL reference set 140 is received. The management application 112 can access the browsing risk score at the managed browser 114.

At stage 312, the management application 112 can send the browsing risk score to the management server 130. For example, the management application 112 can send a data file, such as a JSON file, with the browsing risk score using an API call or other communication protocol. The data file can include other information as well, such as the match percentages for URL patterns.

At stage 314, the management server 130 can compare the browsing risk score to a predetermined threshold. The threshold can be used to designate high-risk browsing behavior. For example, any browsing risk score above the threshold can be considered high-risk and require the enforcement of security protocols.

At stage 316, management server 130 can send security policy enforcement instructions to the management application 112. In some examples, this stage can be performed earlier, such as part of step 302. To identify the relevant security policy enforcement instructions, the management server 130 can look up security enforcement policies associated with the user device 110. The enforcement policies can be based on various factors, such as the user's role in the organization, which applications are installed on the user device 110, and so on. The management server 130 can generate instructions for enforcing the security policy and send the instructions to the management application 112. In addition, or alternatively, the management server 130 can notify an admin user who can then decide whether to enforce security policies. The browsing risk score can also be displayed in the managed browser 114 so that the user can know the browsing behavior is causing a high browsing risk score.

At stage 318, the management application 112 can execute the security policy enforcement instructions. For example, the management application 112 can block access to certain applications, lock the user out of the user device 110, wipe enterprise data, and so on. Enforcing the security policy can also include sending instructions to the managed browser 114 for restricting access to certain websites, such as by only allowing access to websites with URLs that match to low risk URL patterns.

The example method described above is just one example for using a browsing risk score to enforce security policies. It is not meant to be limiting in any way. For example, some of the stages described as being performed by one component can be performed by another. As an example, at stage 304, the management application 112 can retain the first URL pattern set 140, at stage 306 the management application 112 can access the browsing history 116 at the managed browser 114 to identify matches, and at stage 308 the management application 112 can calculate the browsing risk score. In another example, the management application 112 can compare the browsing risk score to the threshold at stage 314 and then enforce the security policy at stage 318 without needing to send the browsing risk score to the management server 130 and await instructions. The managed browser 114 can also enforce security policies without awaiting instructions, such as by proactively blocking access to certain websites.

Figure 4:
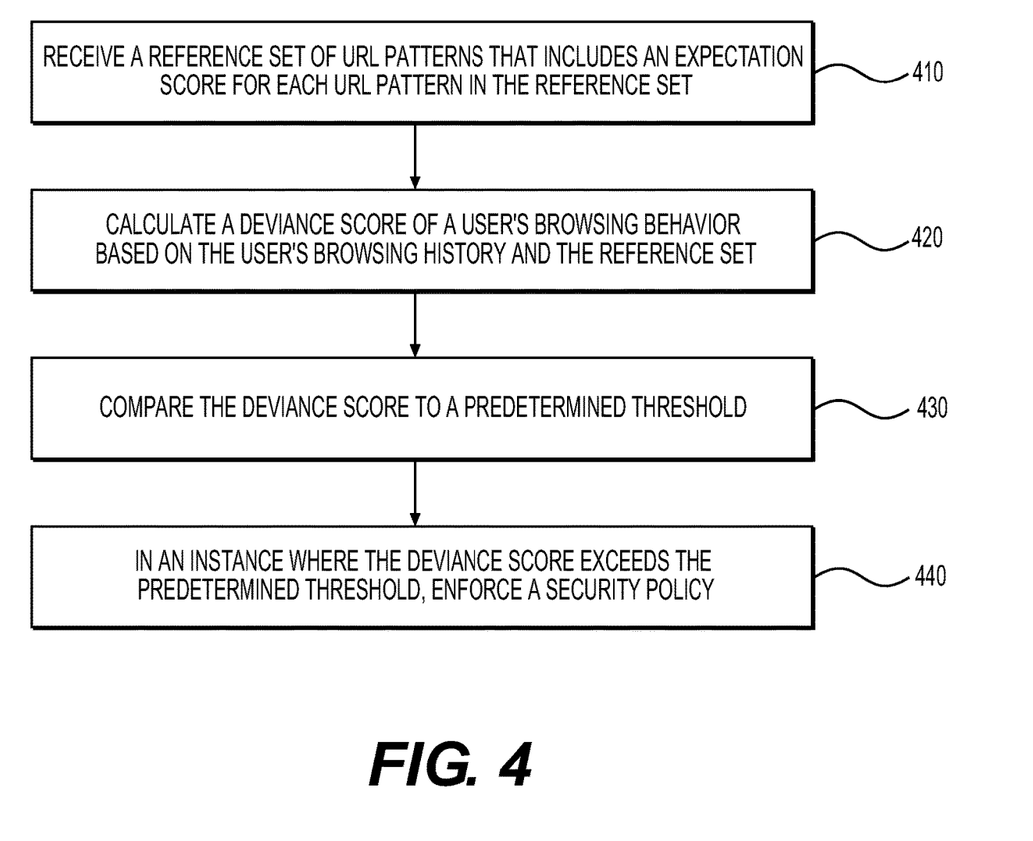
FIG. 4 is another flowchart of an example method for URL pattern-based anomaly detection.

FIG. 4 is a flowchart of an example method for URL pattern-based anomaly detection. Anomaly detection can be used to detect abnormal browsing actions that may indicate a potential security risk. For example, anomalies can be caused by malware, a compromised device, a change in a user's job functions, duress, backend redirection, a malicious proxy, and in some cases because of malicious intent of the user.

At stage 410, the user device 110 can receive the second URL reference set 150. The second URL reference set 150 can be a metric that represents "normal" browsing behavior of the user. The second URL reference set 150 can include second URL pattern set 152, which can include URL patterns corresponding to websites or web domains that the user has visited. Each URL pattern in the second URL pattern set 152 can have an associated expectation score 154. The expectation score 154 can represent the percentage of the number of times the associated URL pattern has been accessed out of all the URLs accessed. In other words, the second URL reference set 150 can indicate what percentage of the user's browsing activity is spent on which websites.

The second URL reference set 150 can be generated based on the user's browsing history at only the user device 110, or, alternatively, based on the user's aggregated browsing history across all enrolled user devices. For example, the second URL reference set 150 can be generated from the user's browsing behavior on a smartphone, tablet, laptop computer, and multi-user devices that the user logged into. In order to protect the privacy of the user's browsing, each user device that the user uses can generate a second URL reference set 150. The user devices can send their second URL reference sets 150 to the management server 130, and the management server 130 can aggregate the URL reference sets into a single second URL reference set 150. The URL reference sets generated at the user devices can include metadata to make the aggregated URL reference set 150 more accurate. For example, for each URL pattern, the URL sets generated at the user devices can indicate the number of matches in the browsing history and the time period over which the visits occurred. The management server 130 can use the URL sets from the user devices to calculate the percentage of visits by a user to websites matching each URL pattern in the second URL pattern set 152 across all enrolled devices. Because the user devices are sending URL reference sets and not the browsing histories, the user's actual browsing history is kept private.

Table 4 shows an example JSON file of a second URL reference set 150:

TABLE 4

```
[
    {
        "url_pattern":"google.com",
        "expectation":30.0
    },
    {
        "url_pattern": "amazon.com",
        "expectation":20.0
    },
```

TABLE 4-continued

```
    {
        "expectation":50.0
        "url_pattern": "confluence-euc.eng.vmware.com",
    }
]
```

In the example file above, "url_pattern" corresponds to URL patterns in the second URL pattern set 152 and "expectation" corresponds to the expectation score 154. The expectation score of 30.0 paired with the URL "google.com" indicates that 30% of entries in the user's browsing history 116 match to "google.com." In other words, the user generally visits websites associated with "google.com" 30% of the time. In a similar manner, 20% of the entries in the user's browsing history are related to "amazon.com" and 50% of the entries are related to "confluence-euc.eng.vmware.com."

At stage 420, the user device 110 can calculate a deviance score of the user's browsing behavior based on the user's browsing history and the second URL reference set 150. This can include matching URLs in the browsing history 116 to URL patterns in the second URL pattern set 152. Matches can be exact or partial. For example, a match can occur if a URL pattern matches to any portion of a URL. The user device 110 can match all or a portion of the entries in the browsing history 116 for calculating the deviance score. For example, the user device 110 can match just the entries for websites visited in the last day, week, or month. In one example, the user device 110 can calculate multiple deviance scores, each for a different time range. For example, the user device 110 can calculate deviance scores based on the browsing history over the past day, week, and month.

The deviance score can be calculated based using the identified matches and the expectation scores 154 of the matched URL patterns. For example, Table 5 includes one example of a formula that can be used to calculate the deviance score:

TABLE 5

$$\text{Deviation Score} = \sqrt{\sum (\text{Match}_n - \text{Exp Score}_n)^2}$$

In the example formula above, "$\text{Match}_n$" represents the percentage of URLs in the browsing history 116 that match to the URL pattern "n" in the second URL pattern set 152. For example, if the browser history 116 has 1,000 entries and 100 of them match to "website.com/page1," then the $\text{Match}_n$ for "website.com/page1" would be 10 because 10 percent of the entries match to "website.com/page1." In other words, 10 percent of the pages the user visited with the managed browser 114 included "website.com/page1" in the URL. "$\text{Exp Score}_n$" represents the expectation score 154 associated with the URL pattern "n."

As an example, assume that the URLs in the browser history 116 match to three URL patterns. The match percentage for the first URL pattern ("$\text{Match}_1$") is 45, the match percentage of URL pattern 2 ("$\text{Match}_2$") is 30, and match percentage of the third URL pattern ("$\text{Match}_3$") is 25. The expectation scores 154 for the three URL patterns are 20, 50, and 30 respectively. This means that the Expectation $\text{Score}_1$ is 20, the Expectation $\text{Score}_2$ is 50, and the Expectation $\text{Score}_3$ is 30. Using the formula in Table 5, the browsing risk score for the user would be calculated as shown in Table 6 below:

TABLE 6

$$\text{Deviance Score} = \sqrt{\frac{(\text{Match}_1 - \text{Exp Score}_1)^2 + (\text{Match}_2 - \text{Exp Score}_2)^2 +}{(\text{Match}_3 - \text{Exp Score}_3)^2}} =$$

$$\sqrt{(45-20)^2 + (30-50)^2 + (25-30)^2} = 32.4$$

The deviance score can be calculated at periodic intervals. Alternatively, or in addition, the deviance score can be calculated when an event occurs that may change the browsing risk score, such as when the user visits a web page.

At stage 430, the user device 110 can compare the deviance score to a predetermined threshold. The threshold can be used to identify anomalous browsing behavior. The threshold can be set at the UEM system 120. For example, an admin user can set the predetermined threshold using an admin console. Browsing behavior can be considered anomalous if the deviances score exceeds the threshold.

At stage 440, the user device 110 can enforce a security policy based on the deviance score exceeding a threshold. For example, the user device 110 can notify the management server 130, which can in turn notify an admin. The admin can investigate the anomalous browsing behavior to determine whether further action is needed. This allows an admin to be notified without moving the user's browsing history 116 off the user device 110. Security policies can also be enforced at the user device 110. Some examples of enforcing a security policy can include locking the user device 110, blocking access to or wiping enterprise data on the user device 110, restricting access to certain applications, notifying an administrator, and so on.

The security policy enforcement can include multiple tiers of enforcement. Each tier can have an associated threshold deviance risk score and set of policies to enforce. Each tier can be based on a different deviance level. As an example, on a 100-point scale, 0-30 can be "low deviance," 31-60 can be "medium deviance," and 71-100 can be "high deviance." Different security policies can be enforced for each category. For example, if a user's deviance score is low, then no security policy is enforced. If the user's deviance score is medium, then a first-tier security policy can be enforced, such as notifying the user and/or an admin and restricting access to certain websites and applications. If the user's deviance score reaches the high range, then a second-tier security policy can be enforced, such as by locking the user device 110 or wiping enterprise data from the user device 110.

Figure 5:
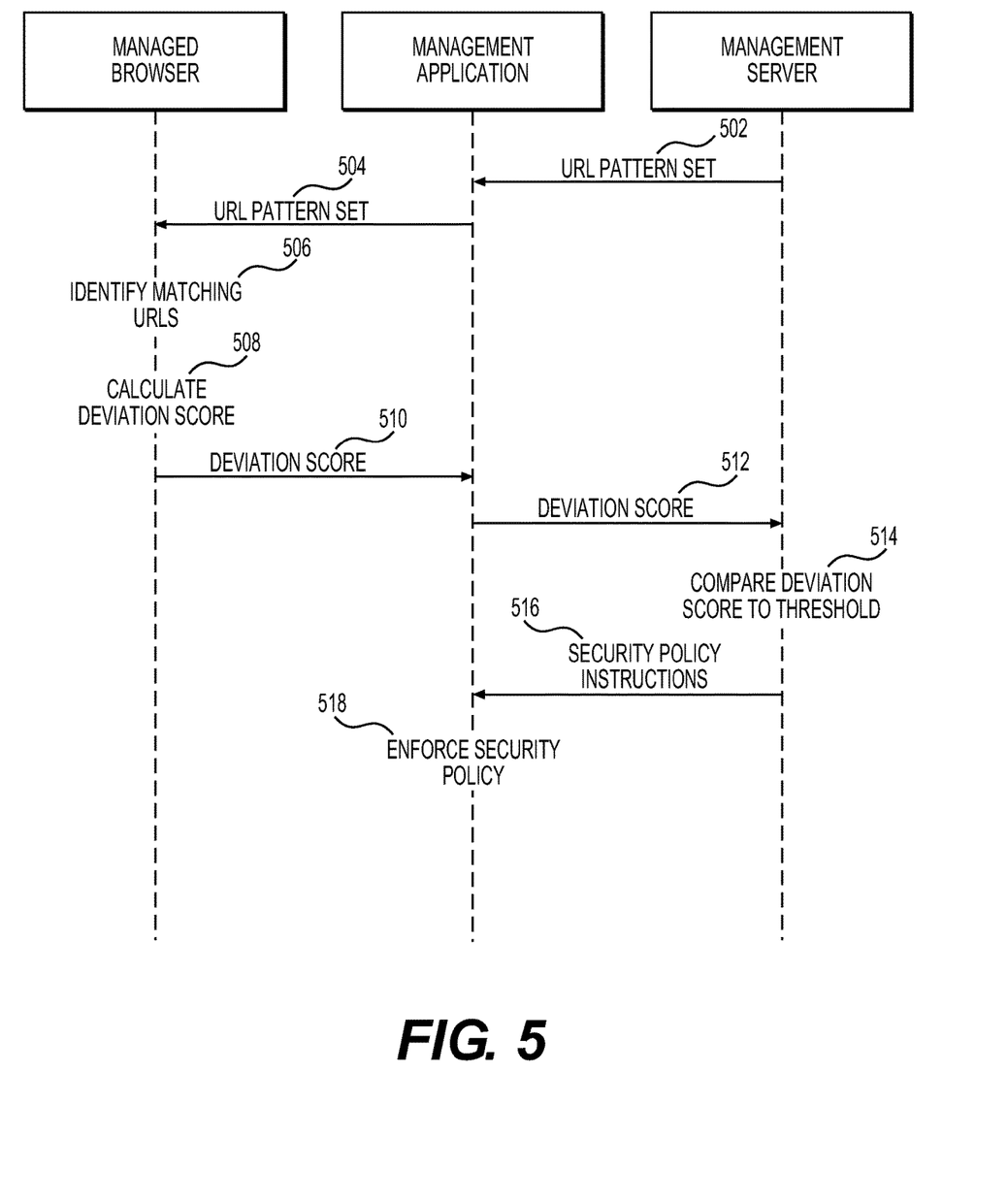
FIG. 5 is a sequence diagram of an example method for URL pattern-based anomaly detection.

FIG. 5 is a sequence diagram of an example method for URL pattern-based anomaly detection. At stage 502, the management server 130 can send the second URL reference set 150 to the management application 112. The second URL reference set 150 can include second URL pattern set 152, which can include URL patterns corresponding to websites or web domains that the user (or another user or set of users) has visited. Each URL pattern in the second URL pattern set 152 can have an associated expectation score 154. The expectation score 154 can represent the percentage of the number of times the associated URL pattern has been accessed out of all the URLs accessed.

At stage 504, the management application 112 can send the second URL reference set 150 to the managed browser 114. Sending the first second reference set 150 can include saving the second URL reference set 150 on the user device 110, such as by saving the second URL reference set 150 as a data file on a hard drive or memory. The managed browser 114 can have access to the data file for calculating the browsing risk.

At stage 506, the managed browser 114 can identify entries in the browsing history 116 that match the second URL reference set 150. For example, each entry in the browsing history 116 can correspond to an instance where the user visited a web page. Each entry can include the URL of the web page and other information, such as the website's name and metadata, such as a timestamp of when the user visited the website and the amount of time spent on the website. For each entry in the browsing history, the managed browser 114 can attempt to identify a URL pattern in the second URL pattern set 152 that wholly or partially matches the URL of a browsing history entry. For example, the URL "webpage.com/page1" can match to the URL pattern "webpage.com/page1" and the URL pattern "webpage.com" because both URL patterns exist in the URL.

At stage 508, the managed browser 114 can calculate a deviance score. The managed browser 114 can calculate the deviance score using any kind of formula designated by the UEM system 120. In one example, the deviance score can be calculated by treating the percentage of entries that match a URL pattern and the corresponding expectation score as Euclidean vector pairings. The managed browser 114 can calculate the Euclidean distance of the vector pairings, which would represent the average distance between each vector pairing. In other words, the Euclidean distance, which can be used as the deviance score, can represent the average deviation of the user's recent browsing history to his historical browsing behavior. This type of formula is illustrated in Table 5 above regarding FIG. 4.

At stage 510, the managed browser 114 can send the deviance score to the management application 112. Sending the deviance score can include making the deviance accessible by the management application 112. For example, the managed browser 114 can retain the deviance score and update the score when certain events occur, such as when the user visits a website. The management application 112 can access the deviance score at the managed browser 114.

At stage 512, the management application 112 can send the deviance score to the management server 130. For example, the management application 112 can send a data file, such as a JSON file, with the deviance score using an API call or other communication protocol. The data file can include other information as well, such as the match percentages for URL patterns.

At stage 514, the management server 130 can compare the deviance score to a threshold. The threshold can be used to designate a level of anomalous browsing behavior that is high risk or should be reviewed. For example, any deviance score above the threshold can be considered a potential security risk and require the enforcement of security protocols.

At stage 516, management server 130 can send security policy enforcement instructions to the management application 112. For example, when the deviance score exceeds the threshold, the management server 130 can look up security enforcement policies associated with the user device 110. The enforcement policies can be based on various factors, such as the user's role in the organization, which applications are installed on the user device 110, and so on. The management server 130 can generate instructions for enforcing the security policy and send the instructions to the management application 112. In addition, or alternatively, the management server 130 can notify an admin user who can then decide whether to enforce security policies. The deviance score can also be displayed in the managed browser 114 so that the user can know that recent browsing behavior is causing a high deviance score. In some examples, the management server 130 can send the security policy enforcement instructions at an earlier stage, such as part of stage 502.

At stage 518, the management application 112 can enforce the security policy enforcement instructions. For example, the management application 112 can block access to certain applications, lock the user out of the user device 110, wipe enterprise data, and so on. Enforcing the security policy can also include sending instructions to the managed browser 114 for restricting access to certain websites, such as by only allowing access to websites with URLs that match to low risk URL patterns.

The example method described above is just one example for using a deviance score to enforce security policies. It is not meant to be limiting in any way. For example, some of the stages described as being performed by one component can be performed by another. As an example, at stage 504, the management application 112 can retain the second URL pattern set 150, at stage 506 the management application 112 can access the browsing history 116 at the managed browser 114 to identify matches, and at stage 508 the management application 112 can calculate the deviance score. In another example, the management application 112 can compare the deviance score to the threshold at stage 514 and then enforce the security policy at stage 518 without needing to send the deviance score to the management server 130 and await instructions. The managed browser 114 can also enforce security policies without awaiting instructions, such as be proactively blocking access to certain websites.

Figure 6A:
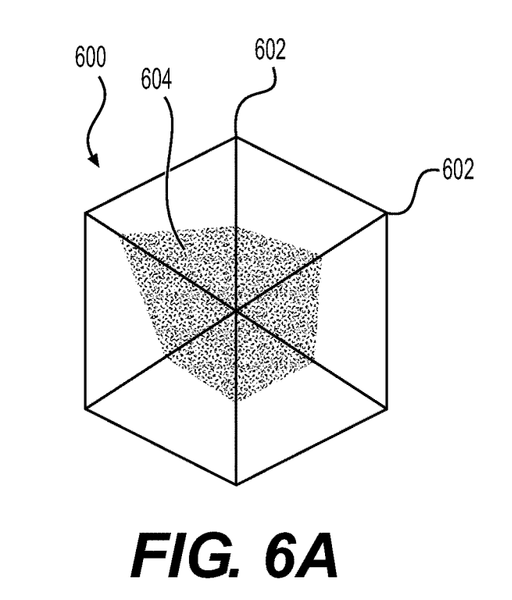
FIGS. 6A, 6B, and 6C are polygon illustrations of user browsing behavior.
Figure 6B:
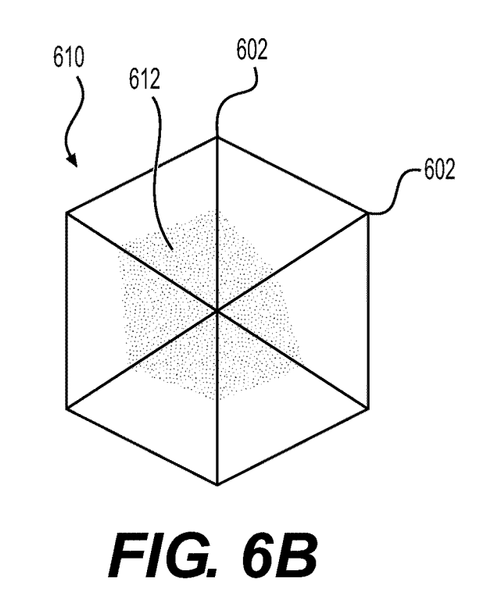
Figure 6C:
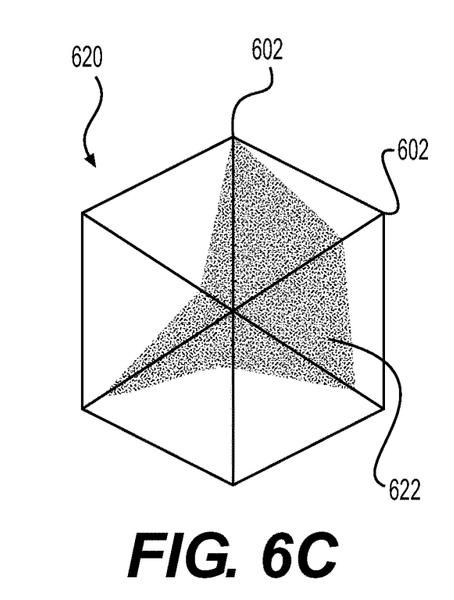

FIGS. 6A, 6B, and 6C are polygon illustrations of user browsing behavior. FIG. 6A includes a browsing polygon 600 that illustrates "normal" browsing behavior for a user, FIG. 6B includes a browsing polygon 610 that illustrates a slight deviation from the user's "normal" browsing behavior, and FIG. 6C includes a browsing polygon 620 that illustrates a high deviation from the user's "normal" browsing behavior. Vertices 602 of the browsing polygons 600, 610, 620 represent URL patterns. Because the browsing polygons 600, 610, 620 are hexagons, they represent a URL pattern set with six URL patterns.

Shaded regions 604, 612, and 622 illustrate measured browsing behavior of a user. The closer a shaded region comes to one of the vertices 602, the larger the percentage of entries in the user's browsing history 116 match to the corresponding URL pattern. The shaded region 604 of the browsing polygon 600 represents the user's "normal" browsing behavior. The shaded region 612 of the browsing polygon 610 represents the user browsing behavior that slightly deviates from the "normal" browsing behavior. This is shown by the shaded region 612 having a similar shape to the shaded region 604. The shaded region 622, however, has a shape that greatly differs from the shaded region 604, and therefore represents a high deviation in browsing behavior.

The browsing polygons 600, 610, 620 are examples of a graphic representation of user browsing behavior that can be presented to an admin, or the user, to visually depict how a user's recent browsing behavior may differ from historical browsing behavior.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for enforcing security policies on a user's device based on Uniform Resource Locator (URL) pattern-based risk scoring and anomaly detection, the method comprising:
   receiving a first reference set of URL patterns that includes a URL risk score for each URL pattern in the first reference set;
   comparing entries in a browsing history of the user, to the URL patterns in the first reference set, wherein some of the entries in the browsing history do not match any of the URL patterns in the first reference set;
   calculating a browsing risk score for the user's browsing behavior, the browsing risk score being calculated based on the comparison of the entries in the browsing history to the URL patterns in the first reference set, wherein calculating the browsing risk score comprises applying a predetermined default URL risk score to the entries in the browsing history that do not match any of the URL patterns in the first reference set;
   comparing the browsing risk score to a first predetermined threshold; and
   in an instance where the browsing risk score exceeds the first predetermined threshold, enforcing a first security policy at the user's device.

2. The method of claim 1, wherein calculating the browsing risk score further comprises:
   identifying, based on the comparison of the entries in the browsing history to the URL patterns in the first reference set, entries in the browsing history that match URL patterns in the first reference set;
   for each URL pattern in the first reference set with at least one matching entry in the browsing history, determining a percentage of matching entries in browsing history; and
   multiplying, for each URL pattern in the first reference set with at least one matching entry in the browsing history, the percentage of matching entries for the URL pattern by the URL risk score in the first reference set for the URL pattern.

3. The method of claim 1, further comprising:
   identifying, based on the comparison of the entries in the browsing history to the URL patterns in the first reference set, entries in the browsing history that each matches multiple of the URL patterns in the first reference set; and
   for each entry in the browsing history that matches multiple of the URL patterns in the first reference set, applying, to the entry, the greatest of the URL risk scores in the first reference set for the matching URL patterns, when calculating the browsing risk score.

4. The method of claim 1, further comprising:
   receiving a second reference set of URL patterns that includes an expected usage score for each URL pattern in the second reference set, each expected usage score indicating a percentage of entries in the browsing history that are expected to match the corresponding URL pattern in the second reference set;
   comparing the entries in the browsing history to the URL patterns in the second reference set;
   calculating a deviance score indicating a deviance of the user's browsing behavior from a historical browsing history of the user, the deviance score being calculated based on the comparison of the entries in the browsing history to the URL patterns in the second reference set;
   comparing the deviance score to a second predetermined threshold; and
   in an instance where the deviance score exceeds the second predetermined threshold, enforcing a second security policy at the user's device.

5. The method of claim 4, wherein calculating the deviance score comprises:
   identifying, based on the comparison of the entries in the browsing history to the URL patterns in the second reference set, entries in the browsing history that match URL patterns in the second reference set;
   for each URL pattern in the second reference set with at least one matching entry in the browsing history, determining an actual percentage of matching entries in the browsing history; and
   calculating a Euclidean distance of a plurality of vectors, wherein each vector includes, for one of the URL patterns in the second reference set, the actual percentage of matching entries in the browsing history and a corresponding expected percentage of matching entries in the browsing history.

6. The method of claim 1, wherein the browsing risk score exceeds the first predetermined threshold, and enforcing the first security policy at the user's device includes at least one of: restricting access to a managed application on the user's device, locking the user's device, and restricting access of the user's device to an enterprise resource or to a network.

7. A non-transitory, computer-readable medium containing instructions that, when executed by a hardware-based processor, cause the hardware-based processor to perform stages for enforcing security policies on a user's device based on Uniform Resource Locator (URL) pattern-based risk scoring and anomaly detection, the stages comprising:
   receiving a first reference set of URL patterns that includes a URL risk score for each URL pattern in the first reference set;
   comparing entries in a browsing history of the user, to the URL patterns in the first reference set, wherein some of the entries in the browsing history do not match any of the URL patterns in the first reference set;
   calculating a browsing risk score for the user's browsing behavior, the browsing risk score being calculated based on the comparison of the entries in the browsing history to the URL patterns in the first reference set, wherein calculating the browsing risk score comprises applying a predetermined default URL risk score to the entries in the browsing history that do not match any of the URL patterns in the first reference set;

comparing the browsing risk score to a first predetermined threshold; and in an instance where the browsing risk score exceeds the first predetermined threshold, enforcing a first security policy at the user's device.

8. The non-transitory, computer-readable medium of claim 7, wherein calculating the browsing risk score further comprises:

identifying, based on the comparison of the entries in the browsing history to the URL patterns in the first reference set, entries in the browsing history that match URL patterns in the first reference set;

for each URL pattern in the first reference set with at least one matching entry in the browsing history, determining a percentage of matching entries in the browsing history; and multiplying, for each URL pattern in the first reference set with at least one matching entry in the browsing history, the percentage of matching entries for the URL pattern by the URL risk score in the first reference set for the URL pattern.

9. The non-transitory, computer-readable medium of claim 7, the stages further comprising:

identifying, based on the comparison of the entries in the browsing history to the URL patterns in the first reference set, entries in the browsing history that each matches multiple of the URL patterns in the first reference set; and for each entry in the browsing history that matches multiple of the URL patterns in the first reference set, applying, to the entry, the greatest of the URL risk scores in the first reference set for the matching URL patterns, when calculating the browsing risk score.

10. The non-transitory, computer-readable medium of claim 7, the stages further comprising:

receiving a second reference set of URL patterns that includes an expected usage score for each URL pattern in the second reference set, each expected usage score indicating a percentage of entries in the browsing history that are expected to match the corresponding URL pattern in the second reference set;

comparing the entries in the browsing history to the URL patterns in the second reference set;

calculating a deviance score indicating a deviance of the user's browsing behavior from a historical browsing history of the user, the deviance score being calculated based on the comparison of the entries in the browsing history to the URL patterns in the second reference set;

comparing the deviance score to a second predetermined threshold; and in an instance where the deviance score exceeds the second predetermined threshold, enforcing a second security policy at the user's device.

11. The non-transitory, computer-readable medium of claim 10, wherein calculating the deviance score comprises:

identifying, based on the comparison of the entries in the browsing history to the URL patterns in the second reference set, entries in the browsing history that match URL patterns in the second reference set;

for each URL pattern in the second reference set with at least one matching entry in the browsing history, determining an actual percentage of matching entries in the browsing history; and calculating a Euclidean distance of a plurality of vectors, wherein each vector includes, for one of the URL patterns in the second reference set, the actual percentage of matching entries in the browsing history and a corresponding expected percentage of matching entries in the browsing history.

12. The non-transitory, computer-readable medium of claim 7, wherein the browsing risk score exceeds the first predetermined threshold, and enforcing the first security policy at the user's device includes at least one of: restricting access to a managed application on the user's device, locking the user's device, and restricting access of the user's device to an enterprise resource or to a network.

13. A system for enforcing security policies on a user's device based on Uniform Resource Locator (URL) pattern-based risk scoring and anomaly detection, the system comprising:

a memory storage including instructions; and a hardware-based processor that executes the instructions from the memory storage to carry out stages comprising:

receiving a first reference set of URL patterns that includes a URL risk score for each URL pattern in the first reference set;

comparing entries in a browsing history of the user, to the URL patterns in the first reference set, wherein some of the entries in the browsing history do not match any of the URL patterns in the first reference set;

calculating a browsing risk score for the user's browsing behavior, the browsing risk score being calculated based on the comparison of the entries in the browsing history to the URL patterns in the first reference set, wherein calculating the browsing risk score comprises applying a predetermined default URL risk score to the entries in the browsing history that do not match any of the URL patterns in the first reference set;

comparing the browsing risk score to a first predetermined threshold; and in an instance where the browsing risk score exceeds the first predetermined threshold, enforcing a first security policy at the user's device.

14. The system of claim 13, wherein calculating the browsing risk score further comprises:

identifying, based on the comparison of the entries in the browsing history to the URL patterns in the first reference set, entries in the browsing history that match URL patterns in the first reference set;

for each URL pattern in the first reference set with at least one matching entry in the browsing history, determining a percentage of matching entries in the browsing history; and multiplying, for each URL pattern in the first reference set with at least one matching entry in the browsing history, the percentage of matching entries for the URL pattern by the URL risk score in the first reference set for the URL pattern.

15. The system of claim 13, the stages further comprising:

identifying, based on the comparison of the entries in the browsing history to the URL patterns in the first reference set, entries in the browsing history that each matches multiple of the URL patterns in the first reference set; and for each entry in the browsing history that matches multiple of the URL patterns in the first reference set, applying, to the entry, the greatest of the URL risk scores in the first reference set for the matching URL patterns, when calculating the browsing risk score.

16. The system of claim 13, the stages further comprising:

receiving a second reference set of URL patterns that includes an expected usage score for each URL pattern in the second reference set, each expected usage score indicating a percentage of entries in the browsing history that are expected to match the corresponding URL pattern in the second reference set;

comparing the entries in the browsing history to the URL patterns in the second reference set;

calculating a deviance score indicating a deviance of the user's browsing behavior from a historical browsing history of the user, the deviance score being calculated based on the comparison of the entries in the browsing history to the URL patterns in the second reference set;

comparing the deviance score to a second predetermined threshold; and in an instance where the deviance score exceeds the second predetermined threshold, enforcing a second security policy at the user's device.

17. The system of claim 16, wherein calculating the deviance score comprises:

identifying, based on the comparison of the entries in the browsing history to the URL patterns in the second reference set, entries in the browsing history that match URL patterns in the second reference set;

for each URL pattern in the second reference set with at least one matching entry in the browsing history, determining an actual percentage of matching entries in the browsing history; and calculating a Euclidean distance of a plurality of vectors, wherein each vector includes, for one of the URL patterns in the second reference set, the actual percentage of matching entries in the browsing history and a corresponding expected percentage of matching entries in the browsing history.

* * * * *